Figure 1:
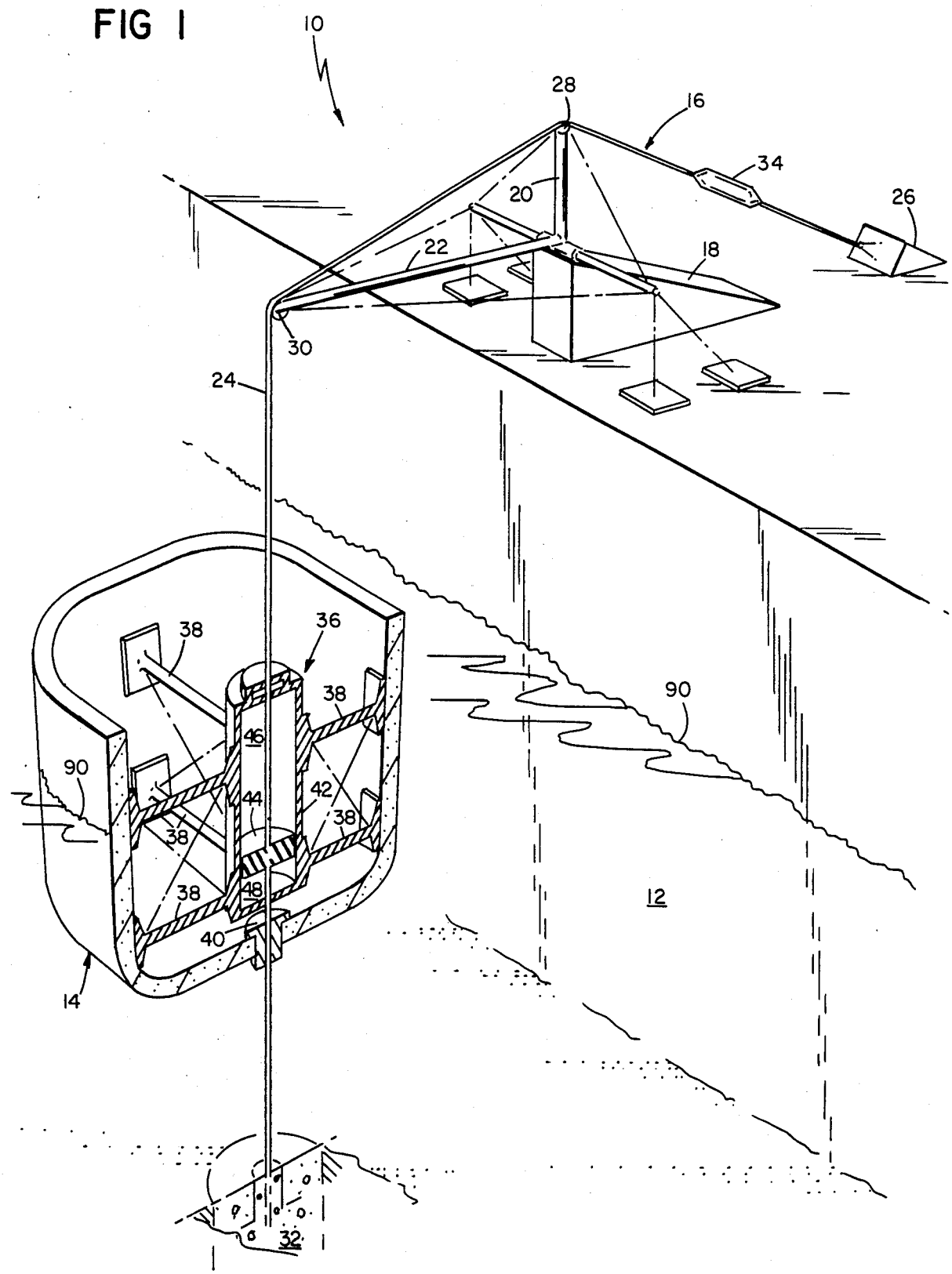

United States Patent [19]

Thompson, Jr. et al.

[11] Patent Number: 4,622,812

[45] Date of Patent: Nov. 18, 1986

[54] APPARATUS FOR DERIVING ENERGY FROM VARIATION OF THE LEVEL OF A BODY OF FLUID

[76] Inventors: Randall Thompson, Jr., Three Craige St., Cambridge, Mass. 02138; Ernesto Blanco, 36 Sandrick Rd., Belmont, Mass. 02178

[21] Appl. No.: 726,127

[22] Filed: Apr. 23, 1985

[51] Int. Cl.⁴ .................................................. F16D 31/02
[52] U.S. Cl. ........................................ 60/398; 417/333
[58] Field of Search ......................... 60/398, 501, 504; 417/331, 333

[56] References Cited

U.S. PATENT DOCUMENTS

| | | | |
|---|---|---|---|
| 3,030,893 | 4/1962 | Shaffer | 417/331 |
| 3,664,125 | 5/1972 | Strange | 60/398 X |
| 4,408,965 | 10/1983 | Ekstrom | 60/398 X |

Primary Examiner—Stephen F. Husar

[57] ABSTRACT

An apparatus for deriving energy from the rise and fall of a body of fluid consisting of a float adapted to move substantially in a vertical plane in response to the rise and fall of the body of liquid. A cylinder having a piston therewithin adapted for vertical movement relative to the cylinder in response to rise and fall of the float with the body of water, in a manner to apply force to fluid in a chamber of the cylinder, the force being applied alternately to opposed chambers of the cylinder, means for converting force applied to the fluid to energy, and means responsive to energy demand for storing energy converted from force applied to the fluid and for converting stored energy to force applied to the fluid.

4 Claims, 2 Drawing Figures

APPARATUS FOR DERIVING ENERGY FROM VARIATION OF THE LEVEL OF A BODY OF FLUID

BACKGROUND OF THE INVENTION

The invention relates to power generation and storage.

In an apparatus for deriving energy from the rise and fall of a body of fluid, e.g. due to tidal movement, it is desirable to have means for storing energy at peak periods of generation for use during periods when demand exceeds generation, e.g. at slack tide, in order that a continuous flow of energy can be provided.

Others have suggested, in mechanical systems, the use of weights which are lifted to store energy when power generation exceeds demand, and allowed to drop to generate extra power when demand exceeds the rate of power generation from the fluid level dependent system.

In Fuchs U.S. Pat. No. 968,930, weights are raised or lowered as desired by actuating a series of clutches. In my copending applications, U.S. Ser. No. 581,828, filed Feb. 21, 1984, Now U.S. Pat. No. 4,541,242, issued Sept. 17, 1985, and U.S. Ser. No. 610,443, filed May 15, 1984, first and second sprockets are in communication by means of a continuous, flexible chain, and a weight disposed on the chain is raised and lowered automatically in response to relative changes in the level of power generation and demand.

SUMMARY OF THE INVENTION

According to the invention, an apparatus for deriving energy from the rise and fall of a body of fluid comprises float means adapted to move substantially in a vertical plane in response to the rise and fall of the body of liquid, a cylinder having a piston therewithin, the piston adapted for vertical movement relative to the cylinder in response to rise and fall of the float with the body of water, in a manner to apply force to fluid in a chamber of the cylinder, the force being applied alternately to opposed chambers of the cylinder, means for converting force applied to the fluid to energy, and means responsive to energy demand for storing energy converted from force applied to the fluid and for converting stored energy to force applied to the fluid.

In preferred embodiments the means responsive to energy demand comprises an accumulator, and energy is stored by increasing the pressure upon a volume of gas within the accumulator; the means for converting force applied to the fluid to energy comprises an hydraulic motor and means connected thereto for generation of electricity; the apparatus further comprises means for delivering fluid into a first chamber of the cylinder while force is applied by movement of the piston to the fluid in a second chamber to cause the fluid to flow from the second chamber, and means for determining the chamber to which fluid is delivered in response to the relative direction of movement of the piston and the cylinder; and the piston is fixed and the cylinder is mounted in the float to rise and fall relative to the piston with the level of the body of fluid, preferably the piston is fixed upon a cable extending substantially vertically between secured points above and below the surface of the body of fluid, and the cylinder rises and falls with the float along the cable.

These and other features of the invention will be understood from the following detailed description of a preferred embodiment, taken in conjunction with the drawings and claims.

PREFERRED EMBODIMENT

The structure and operation of the preferred embodiment of the invention will now be described, after first briefly describing the drawings.

DRAWINGS

Figure 2:
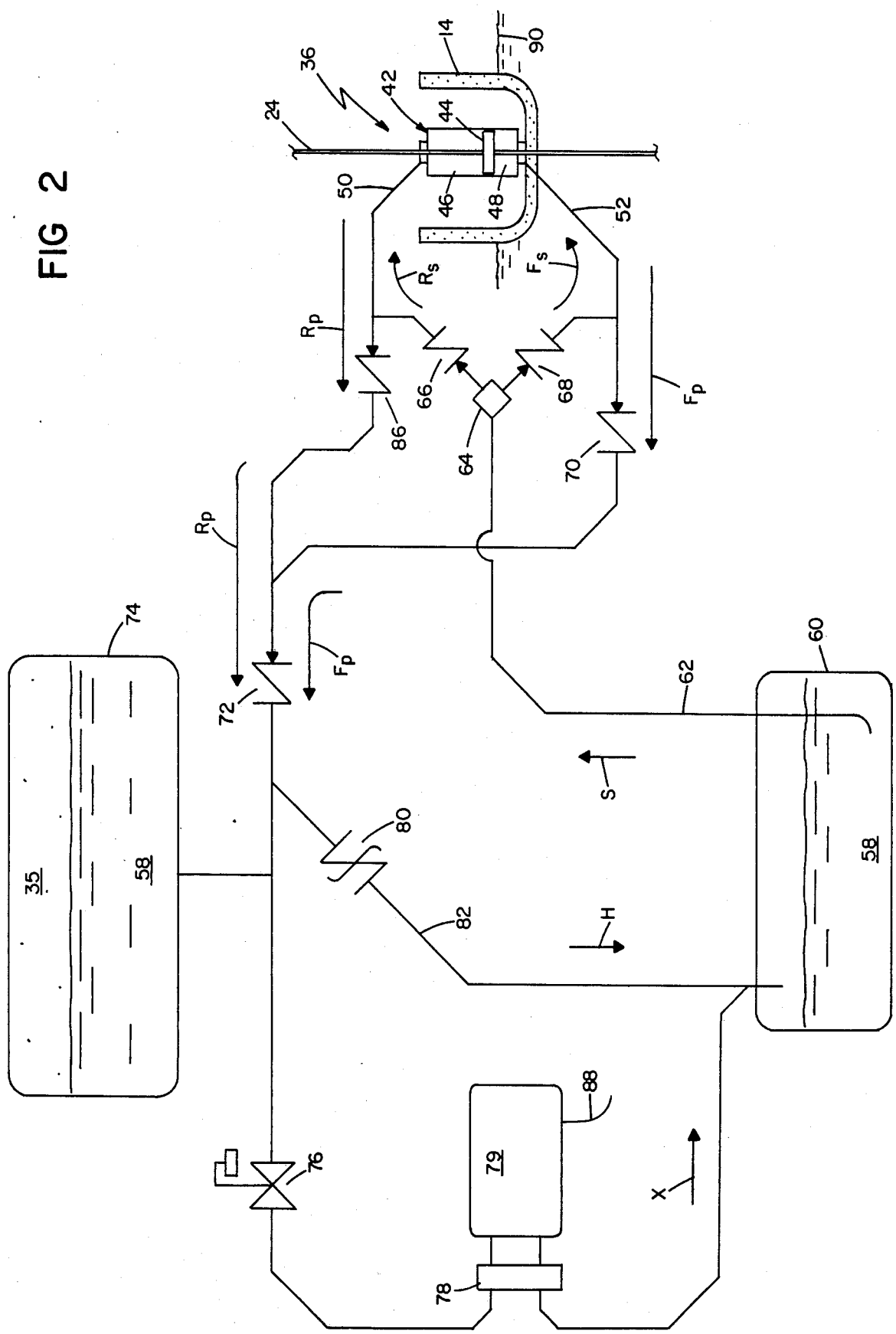

FIG. 1 is a perspective view partially in section of a power generator apparatus of the invention; and FIG. 2 is a schematic flow diagram of the power generation and storage system.

STRUCTURE AND OPERATION

Referring to FIG. 1, the apparatus 10 for deriving energy from the rise and fall of the level of a body of water 12, such as the ocean or other tidal body, includes a float 14 which is placed on the surface of the body of water near a stationary structure 16. Float 14 has weight, when the tide is falling, substantially equal to its buoyancy when the tide is rising. Stationary structure 16 may be on the shore, or on a man-made platform constructed for the purpose of carrying the remainder of the apparatus. Float 14 is restrained by lines and anchors (not shown) so that substantial horizontal movement of the float on the body of water is avoided.

Stationary structure 16 includes a massive, fixed base 18, typically concrete, upon which is rotatably mounted a vertical stanchion 20 and a horizontal outrigger 22. Tension cable 24 extends from footing 26 through fittings 28, 30 at the free ends of the stanchion and outrigger, and then vertically to a piling 32 anchored directly below the outer end of the outrigger. Turnbuckle 34 is provided adjacent the footing to allow the cable to be maintained under proper tension.

The vertical portion of cable 24 extends through hydraulic pump 36, which is rigidly mounted in float 14 by means of brackets 38, and through a water tight sliding seal 40 in the bottom of the float. Affixed on cable 24 within the cylinder 42 of hydraulic pump 36 is piston 44. The upper and lower chambers 46, 48 of the cylinder are connected via hydraulic fluid lines 50, 52, respectively (shown in FIG. 2 only), to the hydraulic system for converting force applied to the hydraulic fluid in the cylinder to energy, e.g. electricity, as will now be described.

Referring to FIG. 2, float 14 (shown diagrammatically) is positioned to travel vertically on tensioned cable 24 with rise and fall of the water level 90. Cylinder 42 is disposed vertically within the float, and the piston 44 fixed on the cable moves up and down within the cylinder, applying pressure to the fluid in the upper and lower chambers alternately. (The length of the cylinder is typically selected to be greater than the local anticipated difference in height between high and low water level so that in most instances, the travel of the piston is not restricted by contact with the inner end surfaces of the cylinder and maximum efficiency is obtained.) By causing the cable to be secured at points both above and below the surface of the water, the piston is held in fixed position by the segment of the cable under tension, rather than relying upon less efficient compressional forces.

The components of the hydraulic system now to be described, are standard, of a type generally available commercially. Hydraulic fluid 58 is drawn from reservoir 60 via supply line 62 to y-valve 64 along the path indicated by arrow, S. Fluid flows from the y-valve along either the path indicated by arrow $R_s$, through one way check valve 66 into the upper chamber of cylinder (when the water level is rising), or fluid flows along the path indicated by arrow $F_s$, through one way check valve 68 into the lower chamber of cylinder (when the water level is falling).

When the water level is rising, relative movement of the piston toward the base of the cylinder applies force to the hydraulic fluid in the lower chamber. The fluid in the lower chamber is thus caused to flow along the path indicated by arrows $F_p$, through one way check valves 70, 72. Flow toward y-valve 64 is prevented by check valve 68.

The fluid flowing under pressure from pump 36 follows the path of least resistance in response to the instantaneous energy demand on the system. When power is required, the pressurized fluid flows through pressure regulator valve 76 to drive oil hydraulic motor 78, which in turn operates generator 79 to generate electricity, which is delivered via line 88. The hydraulic fluid returns to reservoir 60, as indicated by arrow X.

If power generation exceeds demand, the pressurized fluid compresses the volume of gas 35 in the accumulator 74, thus storing energy for later use. When power demand exceeds power generation, the compressed gas in the accumulator expands, thus delivering stored energy into the system.

If the pressure in the system exceeds a preset maximum, as determined by the setting of pressure relief valve 80, the valve opens to release fluid for return to the reservoir via line 82, as indicated by arrow H.

When the water level causes float 14 to rise, the system operates in a similar manner, with the pressurized fluid being forced out of the upper chamber by piston 44 on tensioned cable 24 to flow along the path indicated by arrows $R_p$, through check valve 86.

OTHER EMBODIMENTS

Other embodiments are within the following claims. For example, in addition to the pump, one or more other components of the hydraulic system may be positioned on the float as desired, or the hydraulic pump may be removed from the float and operated from shore or from a fixed platform by means of a lever, using the stationary base as a fulcrum. In such case, float 14 may be a docked boat to which a lever arm is attached, or indeed, any arrangement in which reciprocating vertical movement about a fulcrum is achieved may be harnessed to practice the invention.

Also, the body of water may be caused to rise and fall by use of tidal motion, or other means, e.g. by operation of canal locks or dam gates.

What is claimed is:

1. An apparatus for deriving energy from periodic rise and fall of the level of a body of liquid, comprising
   float means disposed upon said body of liquid and adapted to move substantially ina vertical plane in response to said periodic rise and fall of said body of liquid,
   a cylinder having a piston therewithin, said piston adapted for vertical movement relative to said cylinder in response to rise and fall of said float with said body of liquid, in a manner to apply force to fluid in a chamber of said cylinder, said force being applied alternately to opposed chambers of said cylinder, said piston being fixed and said cylinder being mounted to rise and fall relative to said piston in response to said periodic rise and fall of the level of said body of liquid, and,
   disposed at a location removed from said body of liquid, means for converting force applied to said fluid to energy, and
   an accumulator connected for receiving fluid from said chamber for storing energy in the form of gas pressurized within said accumulator by force applied to said fluid and connected to said means for converting force applied to said fluid to energy.

2. The apparatus of claim 1 wherein said means for converting force applied to said fluid to energy comprises an hydraulic motor and means connected thereto for generation of electricity 3. The apparatus of claim 1 further comprising
   means for delivering fluid into a first said chamber of said cylinder while force is applied by movement of said piston to the fluid in a second said chamber to cause said fluid to flow from said second chamber, and
   means for determining the chamber to which fluid is delivered in response to the relative direction of movement of said piston and said cylinder.

4. An apparatus for deriving energy from periodic rise and fall of the level of a body of liquid, comprising
   float means disposed upon said body of liquid and adapted to move substantially in a vertical plane in response to said periodic rise and fall of said body of liquid,
   a cylinder having a piston therewithin, said piston adapted for vertical movement relative to said cylinder in response to rise and fall of said float with said body of liquid, in a manner to apply force to fluid in a chamber of said cylinder, said force being applied alternately to opposed chambers of said cylinder,
   said piston being fixed upon a cable extending substantially vertically between secure points above and below the surface of said body of liquid, and said cylinder being mounted in said float to rise and fall, relative to said piston, with said float along said cable, and,
   disposed at a location removed from said body of liquid, means for converting force applied to said fluid to energy, and
   an accumulator connected for receiving fluid from said chamber for storing energy in the form of gas pressurized within said accumulator by force applied to said fluid and connected to said means for converting force applied to said fluid to energy.

* * * * *

UNITED STATES PATENT AND TRADEMARK OFFICE
CERTIFICATE OF CORRECTION

PATENT NO. : 4,622,812

DATED : November 18, 1986

INVENTOR(S) : Randall Thompson, Jr. et al.

It is certified that error appears in the above-identified patent and that said Letters Patent are hereby corrected as shown below:

In the Abstract, line 4, change ".  A" to --, a--.

Col. 1, line 24, change ".  Now" to --, now--.

Col. 3, line 61, change "ina" to --in a--.

Signed and Sealed this

Twenty-eighth Day of April, 1987

Attest:

DONALD J. QUIGG

Attesting Officer     Commissioner of Patents and Trademarks